(12) United States Patent
Connell et al.

(10) Patent No.: US 9,505,391 B2
(45) Date of Patent: Nov. 29, 2016

(54) BRAKE CYLINDER MAINTAINING REFERENCE

(71) Applicant: NEW YORK AIR BRAKE, LLC, Watertown, NY (US)

(72) Inventors: Jason Connell, Bethel Park, PA (US); Eric C. Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 5 days.

(21) Appl. No.: 14/479,962

(22) Filed: Sep. 8, 2014

(65) Prior Publication Data

US 2016/0068148 A1    Mar. 10, 2016

(51) Int. Cl.
| | |
|---|---|
| *B60T 17/04* | (2006.01) |
| *B60T 15/02* | (2006.01) |
| *B60T 15/42* | (2006.01) |
| *B60T 13/66* | (2006.01) |
| *B60T 17/22* | (2006.01) |
| *B60T 13/40* | (2006.01) |
| *B60T 15/30* | (2006.01) |
| *B60T 8/18* | (2006.01) |

(52) U.S. Cl.
CPC ............ *B60T 15/021* (2013.01); *B60T 13/665* (2013.01); *B60T 15/42* (2013.01); *B60T 17/228* (2013.01); *B60T 8/1893* (2013.01); *B60T 13/406* (2013.01); *B60T 15/302* (2013.01); *B60T 17/04* (2013.01)

(58) Field of Classification Search
CPC .... B60T 17/04; B60T 17/228; B60T 13/406; B60T 13/665; B60T 8/1893; B60T 15/302; Y10T 137/7793
USPC .................. 303/3, 7, 15, 22.6, 22.7, 57, 128
See application file for complete search history.

(56) References Cited

U.S. PATENT DOCUMENTS

| | | | |
|---|---|---|---|
| 2,018,789 A | 2/1938 | Farmer et al. | |
| 2,796,300 A * | 6/1957 | Cotter | B60T 15/304 303/35 |
| 2,812,986 A * | 11/1957 | Jeffrey | B60T 15/302 303/45 |
| 2,861,843 A * | 11/1958 | Bentz | B60T 13/266 303/2 |
| 2,958,561 A * | 11/1960 | May | B60T 15/048 303/18 |
| 3,707,314 A * | 12/1972 | Paginton | B60T 15/42 303/36 |
| 4,033,632 A * | 7/1977 | Wilson | B60T 15/52 303/36 |

(Continued)

FOREIGN PATENT DOCUMENTS

AU    2009202435    1/2010

OTHER PUBLICATIONS

International Search Report Form PCT/ISA/220, International Application No. PCT/US2014/054542, pp. 1-10, Dated May 21, 2015.

*Primary Examiner* — Thomas Irvin
(74) *Attorney, Agent, or Firm* — Bond Schoeneck and King PLLC; David Nocilly (57) ABSTRACT

A brake cylinder maintaining system produces a brake cylinder reference pressure based on the difference between the brake pipe pressure and the auxiliary reservoir pressure and then feeds that pressure to a choke and a volume so that the ratio of the reference area of the choke to the volume of stored brake cylinder reference pressure is substantively equal to the ratio of a brake cylinder charging valve area to the brake cylinder volume. The resulting reference pressure may be used to adjust brake cylinder pressure by providing the reference pressure to a standard quick service limiting valve or to a relay that can selectively charge or exhaust the brake cylinder.

16 Claims, 6 Drawing Sheets

(56) References Cited

U.S. PATENT DOCUMENTS

| | | | | |
|---|---|---|---|---|
| 4,125,292 A | * | 11/1978 | Worbois | B60T 15/52 303/36 |
| 4,161,340 A | | 7/1979 | Hart | |
| 4,163,587 A | * | 8/1979 | Limozin | B60T 8/1893 303/22.6 |
| 4,378,950 A | * | 4/1983 | Hart | B60T 13/40 303/36 |
| 4,478,460 A | * | 10/1984 | Wickham | B60T 15/18 303/33 |
| 4,558,907 A | * | 12/1985 | Reiss | B60T 15/22 303/36 |
| 4,776,648 A | * | 10/1988 | Newton | B60T 8/1893 303/2 |
| 4,850,654 A | * | 7/1989 | Hart | B60T 15/42 303/33 |
| 5,071,198 A | * | 12/1991 | Troiani | B60T 15/42 303/33 |
| 5,192,118 A | * | 3/1993 | Balukin | B60T 15/14 303/15 |
| 5,222,788 A | * | 6/1993 | Dimsa | B60T 15/14 303/15 |
| 5,358,315 A | * | 10/1994 | Balukin | B60T 13/585 303/15 |
| 5,564,794 A | * | 10/1996 | Hart | B60T 15/42 303/15 |
| 7,163,090 B2 | | 1/2007 | Huber, Jr. et al. | |
| 7,377,370 B2 | | 5/2008 | Huber, Jr. et al. | |
| 9,108,603 B2 | * | 8/2015 | Call | B60T 17/04 |
| 9,266,516 B2 | * | 2/2016 | Call | B60T 17/228 |
| 2014/0102557 A1 | * | 4/2014 | Call | B60T 17/04 137/505 |
| 2014/0102558 A1 | * | 4/2014 | Call | B60T 17/04 137/505 |
| 2015/0061360 A1 | * | 3/2015 | Vaughn | B60T 17/228 303/9.75 |

* cited by examiner

BRAKE CYLINDER MAINTAINING REFERENCE

BACKGROUND OF THE INVENTION

1. Field of the Invention

The present invention relates to rail car braking systems and, more specifically, to a system for providing an accurate brake cylinder reference pressure and improved pressure regulation.

2. Description of the Related Art

The quick service limiting valve of an Association of American Railroads (AAR) type braking system controls the supply of brake pipe air to the brake cylinder during quick service operations. Recent advancements in quick service limiting valves include modifications to the quick service limiting valve that assist in the replenishment of brake cylinder pressure that may be lost, such as through leakage. For example, one approach is to use a brake cylinder reference pressure based on the actual brake cylinder pressure that pressurizes one side of the diaphragm in the quick service limiting valve so that if brake cylinder pressure leaks below a threshold set by the pressure on the opposing side of the diaphragm, the resulting force imbalance will cause movement that opens communication between the brake pipe and the brake cylinder, thus replenishing any lost brake cylinder pressure, until the force balance is re-established.

In order for this arrangement to work effectively, however, the brake cylinder reference pressure must accurately represent the desired target brake cylinder pressure in all possible scenarios. Current approaches work very well in the situation where the brake cylinder develops a leak after it has been fully pressurized to the desired level. These approaches are not as effective when the brake cylinder has a pre-existing leak such that the brake cylinder leaks while the brake cylinder pressure is being charged. In this situation, the actual brake cylinder pressure is not likely to achieve the desired pressure value. As a consequence, the brake cylinder maintaining reference pressure will not achieve the desired target value and there will not be a desired force imbalance across the quick service limiting valve diaphragm that opens communication between the brake pipe and the brake cylinder to replenish lost brake cylinder pressure.

BRIEF SUMMARY OF THE INVENTION

The present invention comprises a system for maintaining pressure in a brake cylinder that includes a valve responsive to a source of brake pipe pressure and a source of auxiliary reservoir pressure to provide a brake cylinder reference pressure based on the difference between the brake pipe pressure and the auxiliary reservoir pressure. The valve may be an independent poppet style valve, it may be driven by the main service piston, or it may be incorporated as a port positioned in a slide-valve style control valve. In any case, the brake cylinder reference pressure is fed to a choke having a reference area for restricting the flow of the brake cylinder reference pressure and then to a volume in communication with the choke for storing the restricted brake cylinder reference pressure. The ratio of the reference area of the choke to the volume of stored brake cylinder reference pressure is substantively equal to the ratio of a brake cylinder charging valve area to the brake cylinder volume.

The reference pressure may be incorporated into a braking system by providing it to a brake cylinder maintaining charging check valve that selectively allows the brake cylinder reference pressure to be in communication a quick service limiting valve so that the quick service limiting valve operates in response to a difference between the brake cylinder reference pressure and the pressure in the brake cylinder. Alternatively, the reference pressure may be provided to a control port of a relay so that relay is moveable between a first position where a source of brake pipe pressure is connected to the source of brake cylinder pressure and a second position where a source of brake cylinder pressure is connected to an exhaust. The relay will move to the first position if the brake cylinder reference pressure exceeds the brake cylinder pressure and the relay will move to the second position if the brake cylinder pressure exceeds the brake cylinder reference pressure.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
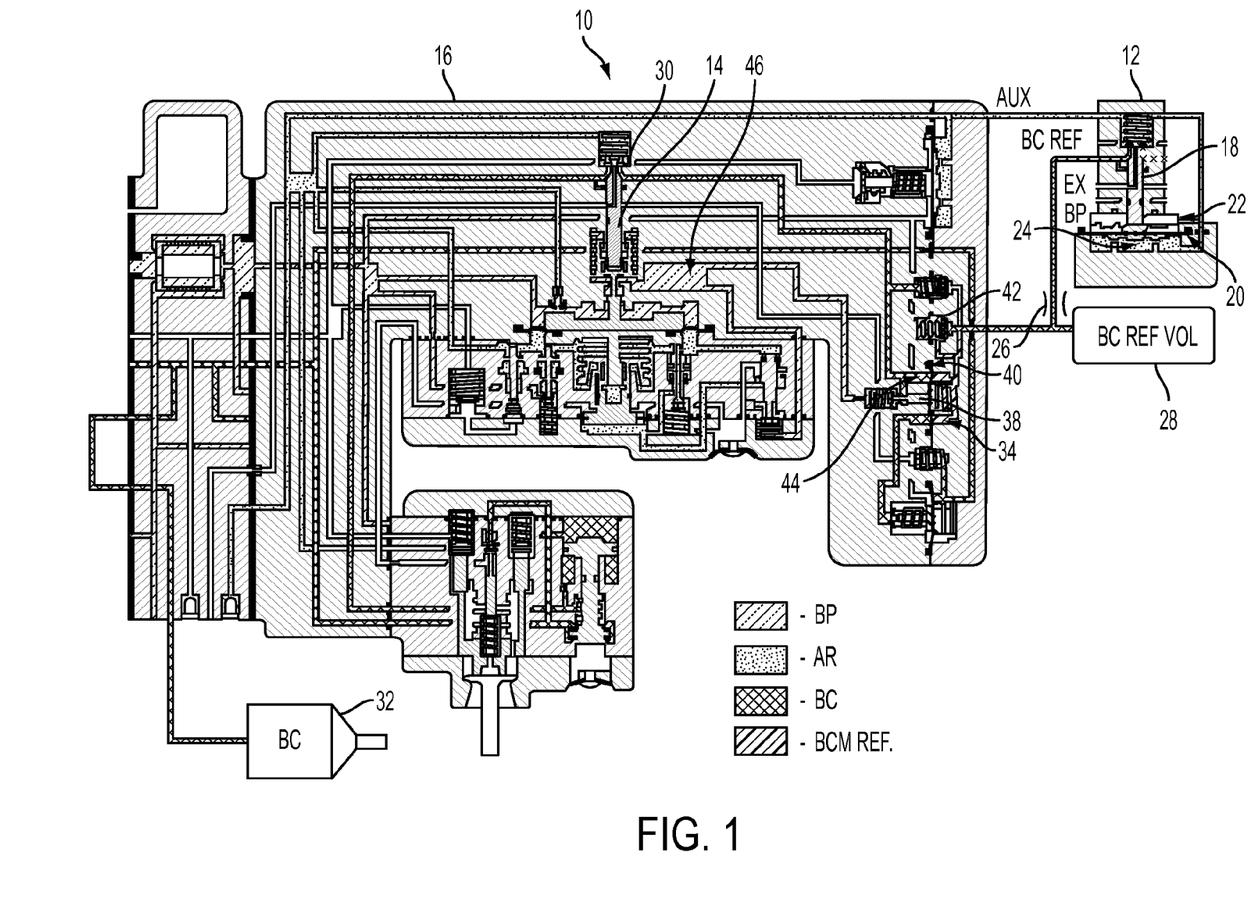
FIG. 1 is a schematic of one embodiment of a brake cylinder maintaining reference system according to the present invention that includes a separate brake cylinder reference pressure valve and reference volume coupled to a quick service limiting valve of a braking system for integration into a braking system.

Referring now to the drawings, wherein like reference numerals refer to like parts throughout, there is seen in FIG. 1 a schematic of a brake cylinder maintaining system 10 according to the present invention. System 10 provides a reference pressure for brake cylinder maintaining in an independent and redundant manner so that the brake cylinder maintenance reference is unaffected by any pre-existing leaks in the brake system, thereby providing greater pressure regulating accuracy across many different scenarios that result in a loss of brake cylinder BC pressure.

System 10 comprises a brake cylinder reference pressure valve 12 that operates in response to the same influences as the main service piston 14 of the service portion 16 of a rail car braking system, shown in FIG. 1 as a detailed schematic of a DB-10 Service Portion available from New York Air Brake, LLC of Watertown, N.Y. More particularly, brake cylinder reference pressure valve 12 has an actuator 18 that is responsive to movement of a diaphragm 20 that separates a first chamber 22 that is in communication with a source of brake pipe BP pressure and a second chamber 24 that is in communication with a source of auxiliary reservoir AUX pressure. When auxiliary reservoir pressure acting in chamber 20 is greater than the brake pipe pressure acting in chamber 22, Actuator 18 opens a communication between auxiliary reservoir AUX pressure and brake cylinder reference BC Ref volume 28. When the auxiliary reservoir and brake pipe pressures in chambers 20 and 22 are substantively equal, actuator 18 moves to lap position, where the communication between the auxiliary reservoir and brake cylinder reference BC Ref volume 28 is severed. In a similar way, when the BP pressure exceeds auxiliary reservoir pressure acting across diaphragm 20, actuator 18 moves downward to exhaust brake cylinder reference BC Ref volume 28. Thus, valve 12 provides a brake cylinder reference BC Ref pressure when actuator 18 moves in response to a reduction in brake pipe BP pressure relative to auxiliary reservoir AR pressure, or to vent the brake cylinder reference BC Ref pressure to an exhaust EX when the brake pipe BP pressure is greater than auxiliary reservoir AUX pressure. The valve is in lap, where brake cylinder reference BC Ref volume is in communication with neither auxiliary reservoir AUX or exhaust when brake pipe BP and auxiliary reservoir AUX are in balance. Thus, valve 12 mimics the operation of the main service piston. While FIG. 1 illustrates a separate actuating diaphragm for valve 12, it could be actuated directly by the main service piston 14 as it operates in a parallel manner.

The brake cylinder reference BC Ref pressure is passed through a suitably sized choke 26 into a brake cylinder reference volume 28. The ratio of the reference area of choke 26 ($A_{reference\ choke}$) to brake cylinder reference volume 28 ($V_{reference\ volume}$) is substantively equal to the ratio of the area of the brake cylinder charging valve 30 ($A_{BC\ Charging\ Vlv}$) of the service piston 14 to the volume of the brake cylinder 32 ($V_{BC\ volume}$), so that the brake cylinder reference volume 28 and the brake cylinder BC pressurize at the same rate and to the same value, as set forth in the following formula:

$$A_{reference\ choke}/V_{reference\ volume} = A_{BC\ Charging\ Vlv}/V_{BC\ volume}$$

As a result, volume 28 provides an accurate measurement of what the brake cylinder BC pressure should be as volume 28 will operate according to what should be occurring in the brake cylinder in the absence of any leakage.

In a first embodiment of the present invention, valve 12 may be integrated into a conventional braking system by putting brake cylinder reference pressure volume 28 into communication with the brake cylinder BC reference chamber 34 of a quick service limiting valve 38. For example, volume 38 may be placed into communication with a brake cylinder maintaining charging check valve 42. Instead of bottling a reference pressure for use in maintaining the brake cylinder BC pressure, as described in U.S. Pub. No. 2014/0102558, hereby incorporated by reference in its entirety, brake cylinder maintaining charging check valve 42 will bottle brake cylinder reference BC Ref pressure in reference chamber 34 of quick service limiting valve 38. As the other side of diaphragm 40 of quick service limiting valve 38 has a chamber 44 that is in communication with brake cylinder BC pressure, quick service limiting valve 38 will operate according to the difference between actual brake cylinder BC pressure and brake cylinder reference BC Ref pressure. Quick service limiting valve 38 will release brake pipe BP pressure into the quick service chamber 46 when the actual brake cylinder BC pressure is below the brake cylinder reference BC Ref pressure (which is the brake cylinder BC pressure that is supposed to occur), thereby addressing the issue of under-pressurization of brake cylinder BC pressure on a real-time basis.

Because the brake cylinder reference BC Ref pressure is determined in response to a change in brake pipe BP pressure relative to auxiliary reservoir AUX pressure, the reference pressure released from valve 12 accurately represents the desired brake cylinder BC pressure that has been ordered via a brake pipe BP pressure reduction, regardless of whether brake cylinder BC has actually achieved the desired pressure. Valve 12 thus determines an intended brake cylinder pressure instead of relying on a feedback of the actual brake cylinder BC pressure achieved during initial brake cylinder charging to determine whether additional charging of the brake cylinder BC is necessary to compensate for leakage. As the brake cylinder reference BC Ref pressure is then provided to quick service limiting valve 38, any under-pressurization of brake cylinder BC relative to the intended brake cylinder BC Ref pressure will be compensated by the operation of quick service limiting valve 38, which would otherwise disconnect brake pipe BP pressure from the quick service chamber only in response to the brake cylinder BC achieving a threshold pressure that is predetermined to indicate a fully charged brake cylinder BC.

Figure 2:
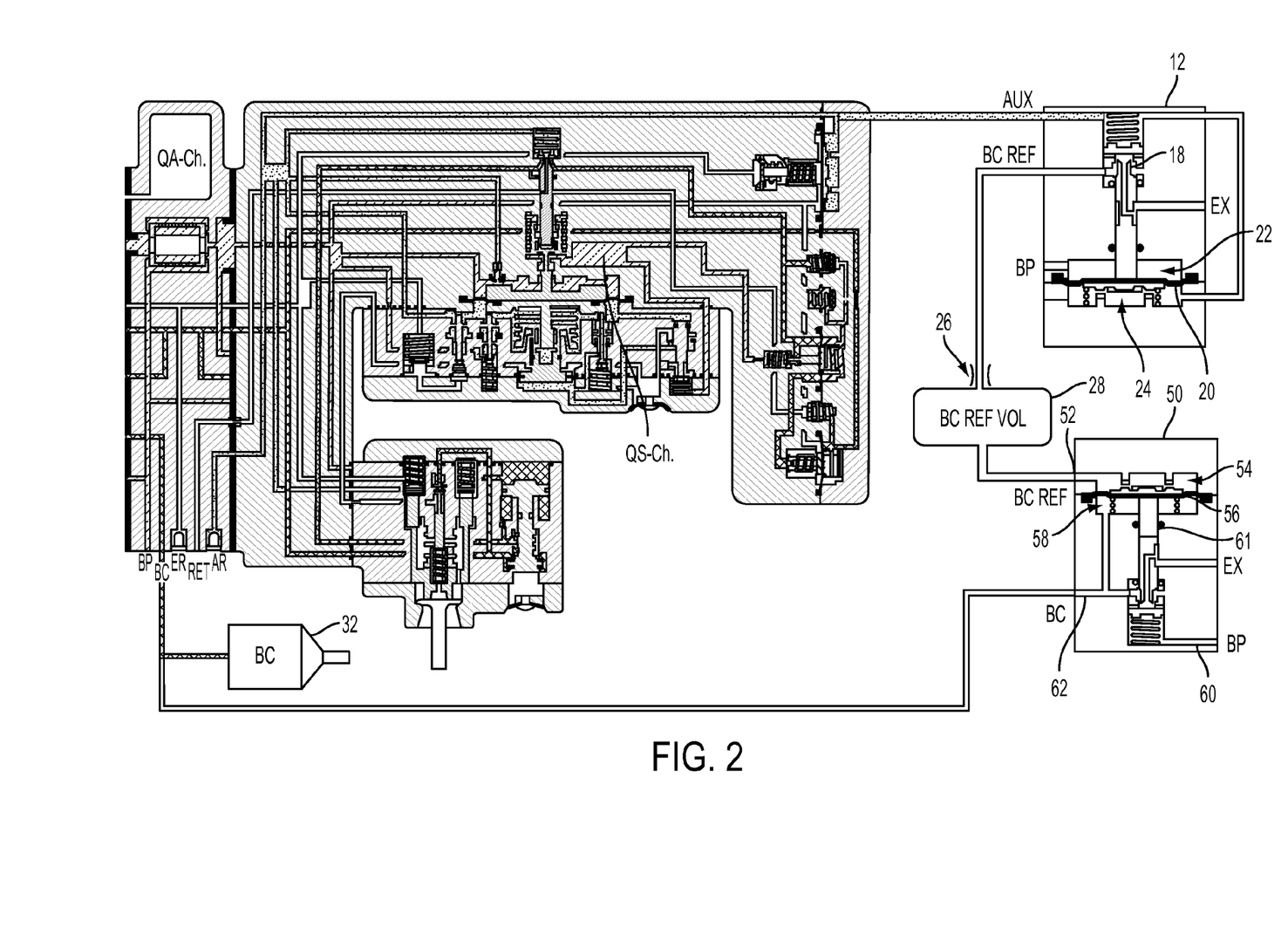
FIG. 2 is a schematic of another embodiment of a brake cylinder maintaining reference system according to the present invention that includes a separate brake cylinder reference pressure valve and reference volume coupled to a brake cylinder maintaining relay for integration into a braking system.

In a second embodiment of the present invention, valve 12 may be integrated into a conventional braking system by putting volume 28 into communication with a brake cylinder maintaining relay 50, as seen in FIG. 2. Relay 50 includes a control port 52 for receiving brake cylinder reference BC Ref pressure and allowing the reference pressure to communicate with a brake cylinder reference BC Ref pressure chamber 54 positioned on one side of a diaphragm 56. The other side of diaphragm 56 includes a chamber 58 in communication with a source of brake cylinder BC pressure. Movement of diaphragm 56 in response to higher pressure in brake cylinder reference BC Ref pressure chamber 54 than in brake cylinder BC pressure chamber 58 opens communication between a brake pipe BP pressure connection 60 and brake cylinder BC pressure connection 62. Movement of diaphragm 56 in response to lower pressure in brake cylinder reference BC Ref pressure chamber 54 than in brake cylinder BC pressure chamber 58 opens communication between brake cylinder BC pressure connection 62 and an exhaust EX. Thus, relay 50 can address both under-pressurization and over-pressurization. It should be recognized various conventional valve structures, such as a 3-way valve, may be used, in lieu of the relay structure seen in FIG. 2 to provide brake cylinder maintaining against both brake cylinder leakage and brake cylinder overcharge in response to brake cylinder reference BC Ref pressure.

When a brake application is made, brake pipe BP pressure is reduced and auxiliary reservoir pressure moves brake cylinder reference BC Ref pressure valve 12 to open the connection between auxiliary reservoir AUX pressure and brake cylinder reference volume 28 through brake cylinder reference choke 26. Because the brake cylinder reference volume 28 charges at the same time and same rate as brake cylinder BC, the resulting pressure in brake cylinder reference volume 28 will accurately reflect the pressure in brake cylinder BC even if there is brake cylinder leakage. The brake cylinder reference BC Ref pressure is directed to control port 52 of brake cylinder maintaining relay 50. Actual brake cylinder BC pressure is fed back to the underside of control diaphragm 56. If the brake cylinder BC pressure leaks, the feedback pressure on the underside of diaphragm 56 is reduced, and the maintaining relay piston 64 moves downward to open the valve connection between brake pipe BP pressure source 60 and brake cylinder BC source 62, thus allowing brake pipe BP pressure to replenish the leaking brake cylinder BC. Valve 12 closes when brake cylinder BC pressure is restored to nominally the same value as the brake cylinder reference BC Ref pressure. In a similar manner, if brake cylinder BC pressure increases due to high pressure leakage into brake cylinder BC, then brake cylinder relay valve 50 will move upward and connect brake cylinder BC to exhaust EX until brake cylinder BC pressure nominally equals the brake cylinder reference BC Ref pressure at control port 52.

Although not explicitly shown in the accompanying figures, it is clear that it is desirable that the brake cylinder reference BC Ref pressure have a small and intentional offset (lower) than the actual brake cylinder BC pressure (when there is no leak). That small pressure offset provides operating hysteresis and valve stability. The pressure offset may be created by bias springs in brake cylinder reference valve 12 and/or brake cylinder maintaining relay 50, by a check valve in the output of brake cylinder reference valve 12 having a cracking pressure equal to the desired pressure offset, or by other means known to those skilled in the art.

Figure 3:
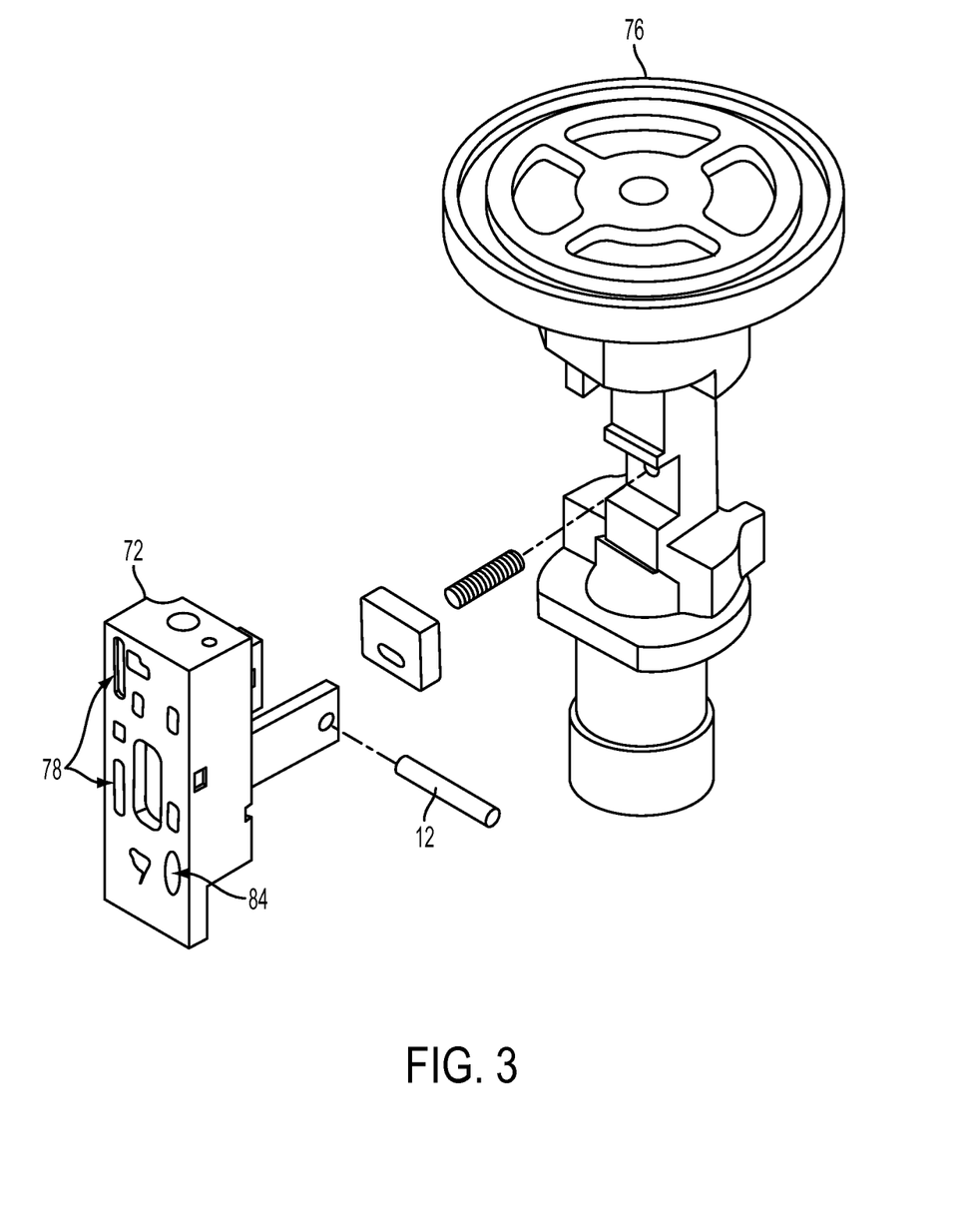
FIG. 3 is a perspective view of a slide valve modified according to the present invention to provide a brake cylinder reference pressure according to the present invention.
Figure 4:
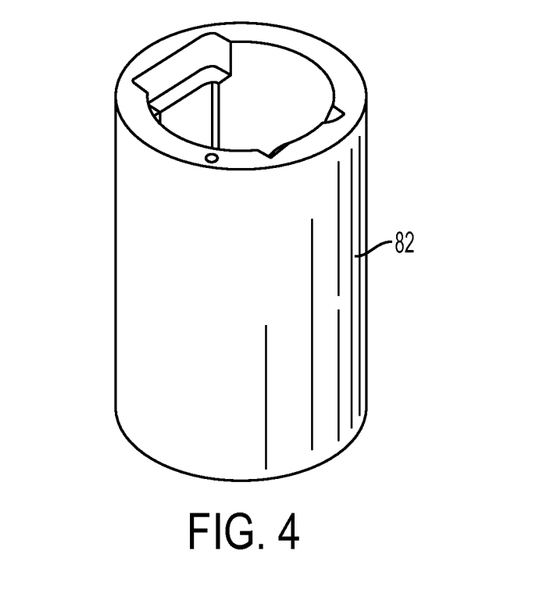
FIG. 4 is a perspective view of a slide valve bushing to be modified according to the present invention to provide a brake cylinder reference pressure according to the present invention.
Figure 5:
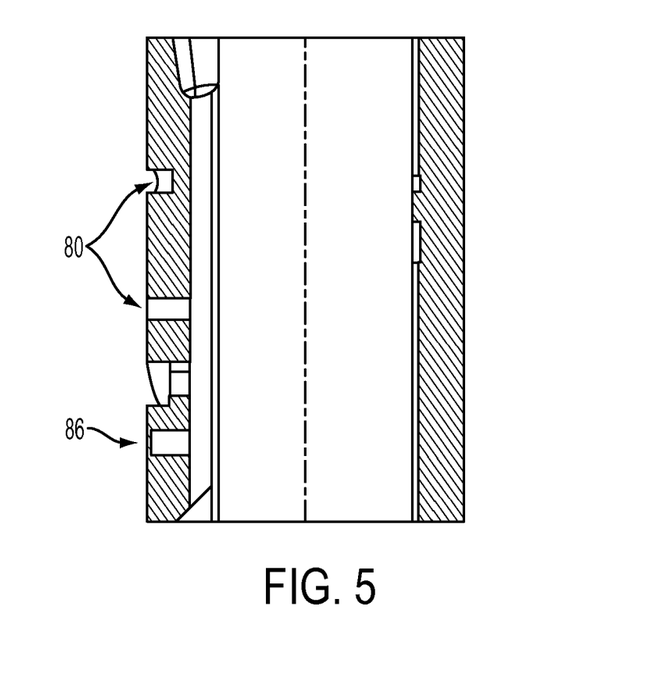
FIG. 5 is a cross-sectional view of a slide valve bushing modified according to the present invention to provide a brake cylinder reference pressure according to the present invention.
Figure 6:
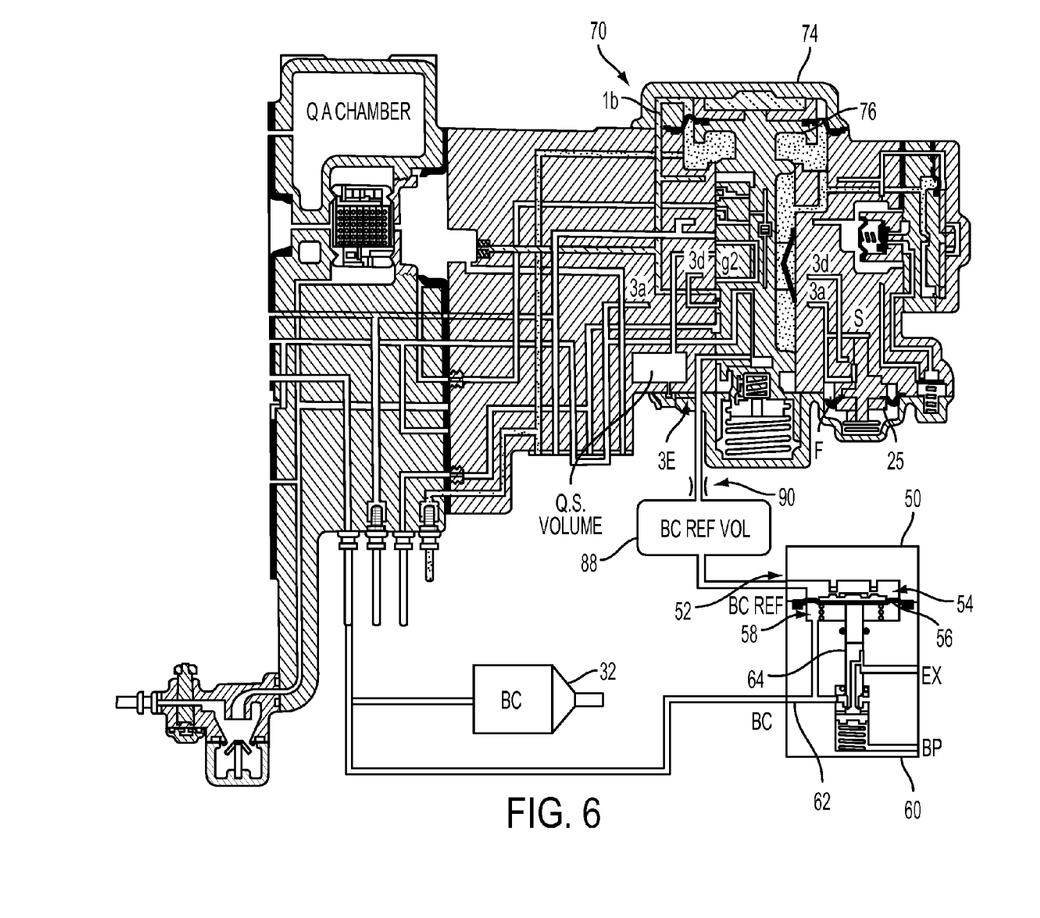
FIG. 6 is a schematic of a further embodiment of a brake cylinder maintaining reference system according to the present invention integrated into slide-valve style control valve according to the present invention.

In a third embodiment of the present invention, a brake cylinder reference BC Ref pressure may be developed using a slide-valve type control valve 70, such as the Wabtec ABDX® control valve available from Wabtec Corporation of Wilmerding, Pa. As seen in FIGS. 3 through 6, this type of control valve 70 uses a slide valve 72 connected to a service piston 76 to perform the valving functions, rather than the poppet valve typical of the NYAB DB-60® described above. The basic service portion 74 operates in a similar fashion as service piston 76 will move under the influence of brake pipe BP pressure and auxiliary reservoir AUX pressures. As seen in FIG. 3, slide valve 72 is connected to service piston 76 and provisioned with multiple ports 78 that align with corresponding ports 80 in a fixed mating valve body bushing 82. Ports 78 and 80 are connected and disconnected as service piston 76 translates through its operating range under the influence of the pressure differential between brake pipe BP pressure and auxiliary reservoir AUX pressure. For example, one existing port in slide valve 72 connects the brake cylinder BC to the auxiliary reservoir AUX pressure when service piston 76 is in the brake applied position, and connects the brake cylinder BC to exhaust EX when service piston 76 is in the brakes released position. For this embodiment, an additional port 84 is added to service slide valve 72 and a corresponding port 86 is added to corresponding main body bushing 82, as seen in FIGS. 4 and 5. Referring to FIG. 6, the output of pressure reference port 84 connects to a brake cylinder reference volume 88 through a brake cylinder reference choke 90. The resulting brake cylinder reference BC Ref pressure may then be directed to control port 52 of brake cylinder maintaining relay 50 described above. Additional port 84 of service slide valve 72 will connect brake cylinder reference volume 88 to auxiliary reservoir pressure when service piston 76 is in the brake applied position, and to connect brake cylinder reference volume 88 to exhaust when service piston 76 is in the brakes released position.

In a fourth embodiment of the present invention, slide valve 72 may be modified as discussed above. In this embodiment, however, brake cylinder reference BC Ref pressure may be connected to and used to pilot a quick service limiting valve 38 in the manner described above with respect to the first embodiment.

Figure 7:
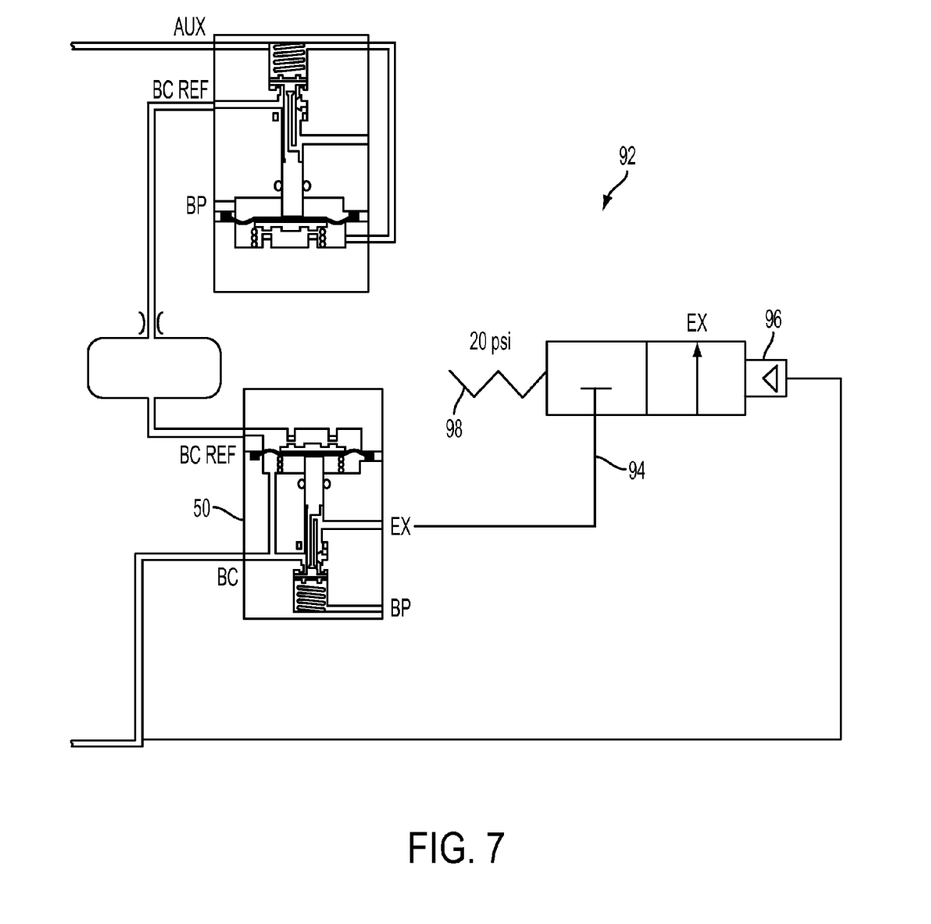
FIG. 7 is a schematic of an exhaust cut-off valve for use with the brake cylinder maintaining reference system according to the present invention.

System 10 may include a nominally 20 psi exhaust cut-off valve 92 to allow an AAR compliant retainer valve to function as intended when relay 50 is used to implement the present invention. For example, as seen in FIG. 7, the inlet 94 of exhaust cut-off valve 92 may be coupled to the exhaust port EX of relay 50. Valve 92 includes a pilot 96 in communication with brake cylinder BC pressure that acts against a valve spring 98 to selectively connect relay 50 to exhaust EX. Valve spring 98 is configured to provide a biasing force equal to about 20 psi and thus will close exhaust cut-off valve 92 if brake cylinder pressure BC falls below about 20 psi. As conventional AAR brake systems include a retainer valve that, when manually activated, will bottle up the brake cylinder pressure by sealing the brake cylinder exhaust. This allows a train driver to bottle up the brakes on the cars, and then make a release and recharge of the brake pipe and all of the control valves on the train while the retainer bottles brake cylinder BC pressure. Retainers are typically used while descending long grades. By AAR standard, the retainer will bottle 20 psi in the high pressure setting. Exhaust cut-off valve 92 thus disables the exhausting of the brake cylinder BC pressure via present invention during retainer operations to comply with AAR standards.

What is claimed is:

1. A system for maintaining pressure in a brake cylinder, comprising:
   a valve responsive to a source of brake pipe pressure and a source of auxiliary reserve pressure to provide a brake cylinder reference pressure based on the difference between the brake pipe pressure and the auxiliary reservoir pressure;
   a choke in communication with the valve and having a reference area for restricting the flow of the brake cylinder reference pressure; and
   a volume in communication with the choke for storing the restricted brake cylinder reference pressure.

2. The system of claim 1, wherein the ratio of the reference area of the choke to the volume of stored brake cylinder reference pressure is substantively equal to the ratio of a brake cylinder charging valve area to the brake cylinder volume.

3. The system of claim 2, wherein the volume is in communication with a brake cylinder maintaining charging check valve.

4. The system of claim 3, wherein the brake cylinder maintaining charging check valve selectively allows the brake cylinder reference pressure to be in communication a quick service limiting valve so that the quick service limiting valve operates in response to a difference between the brake cylinder reference pressure and the pressure in the brake cylinder.

5. The system of claim 4, wherein the valve includes a first chamber in communication with the source of brake pipe pressure, a second volume in communication with the source of auxiliary reservoir pressure, and a diaphragm separating the first and second chambers.

6. The system of claim 4, wherein the valve is operatively connected to a main service piston.

7. The system of claim 1, wherein the volume is in communication with a control port of a relay.

8. The system of claim 7, wherein the relay is moveable between a first position where a source of brake pipe pressure is connected to the source of brake cylinder pressure and a second position where a source of brake cylinder pressure is connected to an exhaust.

9. The system of claim 8, wherein the relay will move to the first position if the brake cylinder reference pressure exceeds the brake cylinder pressure and the relay will move to the second position if the brake cylinder pressure exceeds the brake cylinder reference pressure.

10. The system of claim 9, wherein the relay includes a first chamber that is in communication with the control port and is positioned on one side of a diaphragm and a second chamber that is in communication with a source of brake cylinder pressure and is positioned on the other side of the diaphragm.

11. The system of claim 1, wherein the valve comprises a slide valve having a port in communication with the choke.

12. The system of claim 11, wherein the volume is in communication with a brake cylinder maintaining charging check valve.

13. The system of claim 12, wherein brake cylinder maintaining charging check valve selectively allows the brake cylinder reference pressure to be in communication a quick service limiting valve so that the quick service limiting valve operates in response to a difference between the brake cylinder reference pressure and the pressure in the brake cylinder.

14. The system of claim 11, wherein the volume is in communication with a control port of a relay.

15. The system of claim 14, wherein the relay is moveable between a first position where a source of brake pipe pressure is connected to the source of brake cylinder pressure and a second position where a source of brake cylinder pressure is connected to an exhaust.

16. The system of claim 15, wherein the relay will move to the first position if the brake cylinder reference pressure exceeds the brake cylinder pressure and the relay will move to the second position if the brake cylinder pressure exceeds the brake cylinder reference pressure.

* * * * *